United States Patent Office 2,704,771
Patented Mar. 22, 1955

2,704,771

PREPARATION OF ETHER-SUBSTITUTED
1,5-PENTANEDIOLS

Curtis W. Smith, Berkeley, Calif., assignor to Shell Development Company, Emeryville, Calif., a corporation of Delaware No Drawing. Application April 29, 1952,
Serial No. 285,075

13 Claims. (Cl. 260—615)

This invention relates to a method for preparing substituted 1,5-pentanediols. More particularly, the invention relates to a process for preparing substituted 1,5-pentanediols by selective hydrogenation of delta-valerolactones.

Specifically, the invention provides a process for preparing ether-alkyl substituted 1,5-pentanediols, and preferably the 2-alkoxymethyl 1,5-pentanediols, from the corresponding ether-alkyl substituted delta-valerolactones in high yields and in a generally efficient manner, which comprises treating the said substituted delta-valerolactone with hydrogen at a temperature between 130° C. and 300° C. and an elevated pressure of the order of about 250 p. s. i. to 8000 p. s. i. in the presence of certain hydrogenation catalysts and subsequently recovering the desired ether-alkyl substituted 1,5-pentanediol from the resulting mixture.

This application is a continuation-in-part of my application, Serial No. 124,736, filed October 31, 1949, now U. S. Patent 2,600,275 issued June 10, 1952.

Certain ether-alkyl substituted 1,5-pentanediols, such as 2,4-dimethyl-2-methoxymethyl-1,5-pentanediol, have been found to be particularly valuable in the preparation of inks and dyes and as chemical intermediates for the preparation of plasticizers and lubricants. Various methods for preparing these diols have been suggested in the past but they have all been found to be unfeasible for use on a large commercial scale. It has been proposed, for example, to prepare the ether-alkyl substituted 1,5-pentanediols by hydrolyzing an ether-alkyl substituted dihydropyran, and then hydrogenating the resulting product. This method is undesirable as the ether-alkyl substituted dihydropyrans are difficult to prepare and yield only a small quantity of the desired diol. It has also been proposed to prepare the diols by hydrogenating an ether-alkyl substituted dialdehyde, but these dialdehydes are quite unstable and special care must be employed in their utilization.

It is an object of the invention, therefore, to provide a new method for preparing ether-alkyl substituted 1,5-pentanediols, and particularly the 2-alkoxymethyl substituted 1,5-pentanediols. It is a further object to provide a method for preparing ether-alkyl substituted 1,5-pentanediols from the corresponding substituted delta-valerolactones. It is still a further object to provide a method for preparing ether-alkyl substituted 1,5-pentanediols in high yields and with a maximum of efficiency in operation. It is a further object to provide an efficient and highly economical process for preparing 2-alkoxymethyl substituted 1,5-pentanediols from alkoxyalkyl substituted delta-valerolactones. Other objects and advantages of the invention will be apparent from the following detailed description thereof.

It has been unexpectedly discovered in accordance with the present invention that the ether-alkyl substituted 1,5-pentanediols may be obtained in high yields and at a relatively low cost by treating an ether-alkyl substituted delta-valerolactone corresponding to the desired ether-substituted 1,5-pentanediols with hydrogen at a temperature between 130° C. and 300° C. and a pressure of the order of 500 to 8000 pounds per square inch in the presence of certain hydrogenation catalysts, and subsequently recovering the desired substituted 1,5-pentanediols from the resulting mixture.

That the ether-alkyl substituted 1,5-pentanediols could be obtained in high yields by this method was quite surprising in view of the fact that hydrogenation of other lactones, such as the gamma-lactones, often resulted in the formation of cyclic ether derivatives and little if any of the lactone was converted to the open-chain diol. In the process of the present invention, however, there was no detectable formation of the pyran-type compounds. In addition, it was expected that under the conditions needed to hydrogenate the stable six membered lactone ring, the compounds would also be attacked at the ether linkage. Surprisingly, however, in the present process the hydrogenation occurred only at the lactone linkage.

The substituted delta-valerolactones used in the preparation of the desired substituted 1,5-pentanediols comprise the delta-valerolactones having an ether-alkyl group attached to one of the ring carbon atoms. The expression "ether-alkyl" group as used throughout the specification and claims refers to the group ROX, wherein R is an organic radical and X is a bivalent alkyl radical. Preferred ether-alkyl groups to be attached to the ring are those of the above-described formula wherein R is a hydrocarbon radical, such as an alkyl, cycloalkyl, aryl, alkaryl, arylalkyl, and the like radicals, R is an ether-containing hydrocarbon radical, such as an alkoxyalkyl, cycloalkoxyalkyl, aryloxyalkyl, alkoxycycloalkyl, and R is a hydroxy-substituted hydrocarbon radical, such as hydroxyalkyl and hydroxy-cycloalkyl radicals. Examples of these substituted delta-valerolactones include alpha-ethyl-gamma-phenoxymethyl-delta-valerolactone, alpha, gamma - dibutyl - gamma - cyclohexyloxymethyl - delta-valerolactone, alpha - butyl-gamma-octyloxymethyl-delta-valerolactone, alpha - hexyl-gamma-decyloxyethyl-delta-valerolactone, alpha - methyl - beta-ethoxybutoxymethyl-delta-valerolactone, alpha,beta - dibutyl - gamma-ethoxyhexyloxymethyl-delta-valerolactone, alpha,beta-dimethyl-gamma-(beta-hydroxyethoxymethyl)-delta-valerolactone, and alpha,beta - dibutyl - gamma-(delta-hydroxybutoxymethyl)-delta-valerolactone.

Particularly preferred ether-alkyl substituted delta-valerolactones to be used in the process of the invention include the gamma-alkoxymethyl delta-valerolactones, the gamma-alkoxyalkoxymethyl delta-valerolactones, and the gamma-hydroxyalkoxymethyl delta-valerolactones, such as alpha,beta-diethyl-gamma-butoxymethyl-delta-valerolactone, alpha,gamma - dibutyl - gamma-octyloxymethyl-delta-valerolactone, alpha,gamma-diamyl-gamma-hexyloxymethyl-delta-valerolactone, alpha-butyl-gamma-ethoxyethoxymethyl - delta - valerolactone, alpha-ethyl-gamma - butoxyethoxymethyl-delta-valerolactone, alpha,-gamma - diamyl - gamma-octyloxymethoxymethyl-delta-valerolactone, alpha,beta - dimethyl - gamma - (beta-hydroxyethoxymethyl)-delta-valerolactone, and alpha-butyl-gamma - (delta-hydroxybutoxymethyl) - delta-valerolactone.

Coming under special consideration are the ether-alkyl substituted delta-valerolactones of the formula

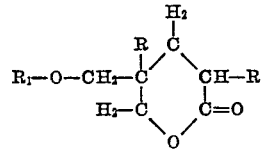

wherein R is a member of the group consisting of hydrogen and aliphatic hydrocarbon radicals, preferably alkyl radicals containing from 1 to 8 carbon atoms, and $R_1$ is a member of the group consisting of alkyl, hydroxyalkyl and alkoxyalkyl radicals containing no more than 10 carbon atoms.

The above-described delta-valerolactones may be prepared by any suitable method. They may be prepared, for example, by treating the corresponding ether-alkyl substituted 1,5-dialdehydes in the liquid phase with an aluminum lower alcoholate, such as aluminum isopropoxide. A more detailed description of this method of preparing the lactones may be found in U. S. Patent 2,526,702, issued October 24, 1950.

Many of the above-described ether-alkyl substituted delta-valerolactones are preferably prepared, however, by a method disclosed and claimed in U. S. Patent 2,576,901, issued November 27, 1951. According to the process disclosed in this patent, the substituted lactones are prepared by condensing an alpha-methylene aldehyde containing at least 4 carbon atoms, such as methacrolein, with an alcohol in the presence of a basic condensation catalyst under substantially anhydrous conditions and then fractionally distilling the condensation mixture in the presence of a basic condensation catalyst. The basic condensation catalysts used in the reaction of the aldehyde and alcohol include the hydroxides and carbonates of the alkali metals, alkaline earth metal hydroxides, organic amines, such as pyridine, piperidine, tetramethylammonium hydroxide, and the like. Such catalysts are preferably employed in amounts sufficient to provide concentrations in the reaction mixture of from about 0.001 to about 0.4 gram equivalents per liter, and more preferably about 0.01 to 0.08 gram equivalents per liter. Although the aldehyde and alcohol may be used in a variety of proportions, the alcohol is preferably employed in molar excess to the aldehyde, e. g., from 2 to 10 moles of alcohol per mole of aldehyde. The reaction may be effected by merely mixing the aldehyde and alcohol, alone or in the presence of an inert solvent or diluent, with the basic condensation catalyst, and then distilling the resulting mixture in the presence of the said catalyst, preferably under reduced pressure. The desired substituted delta-valerolactone, which under reduced pressure generally comes over in the distillate, can be recovered by separating a suitable fraction from the distillate according to the boiling point of the desired lactone.

The aforementioned ether-alkyl substituted delta-valerolactones are converted into the desired ether-alkyl substituted 1,5-pentanediols according to the process of the present invention by treating the said valerolactones with hydrogen at a temperature between 130° C. and 300° C. and superatmospheric pressure in the presence of certain hydrogenation catalyst.

The process may be executed in the presence or absence of added diluents or solvents. In some cases it may be desirable to employ solvents, which are relatively inert to the hydrogenation reaction, such as ethyl alcohol, isopropyl alcohol, ethylene glycol, dioxane, and the like and mixtures thereof, to facilitate operation of the process.

Catalysts that may be used for this hydrogenation reaction comprise the heavy metals of groups I, II and IV to VIII of the periodic table of elements, mixtures of these metals, their alloys and derivatives as their sulfides, oxides and chromites. Examples of such catalysts include silver, copper, iron manganese, molybdenum, nickel, palladium, platinum, chromium, cobalt, rhodium, tungsten, mixtures of the metals, such as copper-silver mixtures, copper-chromium mixtures, nickel-cobalt mixtures, and their derivatives such as copper oxide, copper chromite, nickel sulfide, silver sulfide, and the like. Particularly preferred catalysts are the members of the group consisting of nickel, copper, cobalt, iron, chromium, silver and platinum, and their oxides, sulfides and chromites. These catalysts may be employed in a finely-divided form and dispersed in and throughout the reaction mixture, or they may be employed in a more massive state, either in essentially the pure state or supported upon or carried by an inert carrier material, such as pumice, kieselguhr, diatomaceous earth, clay, alumina, charcoal, carbon or the like, and the reaction mixture contacted therewith as by flowing the mixture over or through a bed of the catalyst or according to other methods known in the art.

The amount of the catalyst employed may vary over a considerable range depending upon the type of catalyst employed, the specific lactone, etc. In general, the amount of the catalyst will vary from 1% to 30% by weight of the reactants. Preferred amounts of catalyst range from 1% to 25% by weight. The above-noted preferred catalysts are generally employed in amounts varying from 1% to 20% by weight.

Temperatures used during the hydrogenation will be at least above 130° C. and not in excess of 300° C. Particularly preferred temperatures range from 100° C. to 250° C. Hydrogen pressures of 250 pounds per square inch are effective, but higher pressures of the order of about 500 to 8000 p. s. i. are generally more preferred. Particularly preferred hydrogen pressures range from about 1000 p. s. i. to 5000 p. s. i.

The process of the invention may be executed in any suitable manner and in any suitable apparatus of the type that is customarily employed for hydrogenation processes. A method of carrying out the process that has been found to be advantageous comprises placing the lactone, solvent and catalyst in a pressure-resistant vessel equipped with the necessary inlets and outlets, heating means, pressure gauge thermometer, etc., and desirably with means for agitating the contents, and subjecting the resulting mixture to the action of hydrogen gas under the aforedescribed conditions of temperature and pressure in the presence of the catalyst until absorption of hydrogen is for practical purposes complete.

Instead of a batchwise method, the process may be carried out in an intermittent or continuous manner, as by flowing a stream of the mixture containing the lactone over and/or through a fixed or moving bed of the hydrogenation catalyst under an atmosphere of hydrogen and at conditions of temperature and pressure of hydrogen as described above.

At the conclusion of the hydrogenation treatment, the desired diol may be recovered directly from the reaction mixture by any suitable manner. For example, the hydrogenation catalyst, if dispersed in the reaction mixture, may be removed by filtration, centrifugation, etc. The desired diol may be recovered and purified by any suitable means, such as by distillation, treatment with selective solvents, by crystallization, or other methods known to the art.

As stated above, the process of the invention is characterized by the ease and low cost of operation and by the high yields of the substituted 1,5-pentanediols produced thereby. The diols are recovered from the process in substantial pure form and can be utilized without further purification in the above-noted applications, e. g., in the preparation of dyes and inks, plasticizers, lubricants and the like.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example I*

About 88 parts of alpha,gamma-dimethyl-gamma-methoxymethyl-delta-valerolactone and 170 parts of ethyl alcohol were mixed in a pressure-resistant reaction vessel suitable for hydrogenation processes. The vessel was constructed of S. A. E. 4140 hydrogenation steel and was equipped with the customary thermometer for measuring the temperature of the contents, a pressure gauge, a stirrer and internally located heating coils through which steam could be passed, and was provided with an inlet for the hydrogen, etc. To this mixture was added 20 parts of copper chromite catalyst. The vessel was closed from the atmosphere and air remaining in the vessel washed out with hydrogen gas. Hydrogen under pressure was introduced into the vessel and the contents heated with agitation to 200° C. under a hydrogen pressure of 1400 pounds per square inch. After four hours, the pressure was released, and the reaction mixture was taken from the reaction vessel and filtered to remove the hydrogenation catalyst. After removal of the ethanol, the filtrate was fractionally distilled to recover 2,4-dimethyl-2-methoxymethyl-1,5-pentanediol. In this experiment, the substituted 1,5-pentanediol was recovered in a yield of 98% based on the amount of lactone consumed, and in a conversion of 63% based on the amount of lactone employed in the process. The 2,4-dimethyl-2-methoxymethyl-1,5-pentanediol had a B. P. of 90–93° C. (0.5 mm.): $n$ 20/D 1.4609, Sp. Gr. 1.0045. There appeared to b no formation of the pyran-type compounds and no indication that the lactones had been attacked at the ether side chain.

*Example II*

About 95 parts of alpha,gamma-dimethyl-gamma-ethoxymethyl-delta-valerolactone is combined with 200 parts of ethyl alcohol and that mixture added to the reaction vessel employed in Example I. 30 parts of Raney nickel is then added to the mixture. The vessel is then closed, the air washed out with hydrogen gas and then hydrogen under pressure is introduced into the vessel and the contents heated with agitation to 225° C. under hydrogen pressure of 2000 pounds per square inch. The mixture is then taken from the reaction vessel and filtered to remove the catalyst. The filtrate is then fractionally distilled to recover alpha,gamma-dimethyl-gamma-ethoxymethyl-1,5-pentanediol, a viscous liquid.

Example III

About 100 parts of alpha,gamma-dimethyl-gamma-dimethyl-pentoxymethyl-delta-valerolactone is combined with 200 parts of ethyl alcohol and the mixture added to the reaction vessel employed in Example I. 30 parts of copper chromite hydrogenation catalyst is then added to the mixture and the mixture exposed, with agitation, at a temperature of 250° C. to hydrogen gas under a pressure of 1200 pounds per square inch. The mixture is then taken from the reaction vessel, the hydrogenation catalyst removed by filtration, and the filtrate fractionally distilled under reduced pressure. After removal of the ethanol, 2,4 - dimethyl - 2 - dimethylpentoxymethyl - 1,5-pentanediol is recovered in high yield as a viscous liquid.

Similar results are obtained by adding equivalent amounts of each of the following delta-valerolactones in place of the alpha,gamma - dimethyl - gamma - dimethyl-pentoxymethyl-delta-valerolactone of the above-described process: alpha-butyl-gamma-phenoxymethyl-delta-valerolactone, alpha,gamma - diamyl - gamma - cyclohexyloxymethyl-delta-valerolactone, and gamma-hexyl-gamma-octyloxymethyl-delta-valerolactone.

Example IV

About 95 parts of alpha,gamma-dimethyl-gamma-ethoxyethoxymethyl - delta - valerolactone is combined with 200 parts of ethyl alcohol and 30 parts of copper chromite and the resulting mixture exposed to 1500 pounds per square inch of hydrogen pressure at a temperature of 200° C. When no further reduction in pressure occurred, the reaction is stopped, the mixture filtered to remove the hydrogenation catalyst, and then fractionally distilled under reduced pressure. After removal of the ethanol, 2,4-dimethyl-2-ethoxyethoxy-methyl-1,5-pentanediol is removed in high yield as a viscous liquid.

Similar results are obtained by adding equivalent amounts of each of the following delta-valerolactones in place of the alpha,gamma-dimethyl-gamma-ethoxyethoxymethyl-delta-valerolactone in the above-described process: alpha,gamma-dimethyl-gamma-butoxymethoxymethyl - delta - valerolactone, alpha - butyl-gamma-cyclohexyloxy-ethoxymethyl-delta-valerolactone, and alpha,gamma - diamyl - gamma - phenyloxybutoxymethyl - delta - valerolactone, and alpha,gamma - diamyl - gamma - phenyloxybutoxymethyl-delta-valerolactone.

Example V

About 90 parts of alpha,gamma-dimethyl-gamma-(beta-hydroxyethoxymethyl) delta-valerolactone is combined with 200 parts of ethyl alcohol and 25 parts of copper chromite and the resulting mixture exposed to 2000 p. s. i. hydrogen pressure at 225° C. When no further reduction in pressure occurred, the reaction is stopped, the mixture filtered and fractionally distilled under reduced pressure as in the preceding example. The resulting product is a viscous liquid identified as 2,4-dimethyl-2-hydroxyethoxymethyl-1,5-pentanediol.

I claim as my invention:

1. A process for preparing ether-alkyl substituted 1,5-pentanediols which comprises treating the corresponding ether-alkyl substituted delta-valerolactone with hydrogen at an elevated pressure and temperature between 130° C. and 300° C. in the presence of a catalyst of the group consisting of heavy metals of groups I, II and IV to VIII of the periodic table of elements, mixtures of these metals, their alloys and their sulfides, oxides and chromites.

2. A process as defined in claim 1 wherein the ether-alkyl substituted delta-valerolactone is a gamma-alkoxymethyl substituted delta-valerolactone.

3. A process as defined in claim 1 wherein the ether-alkyl substituted delta-valerolactone is a gamma-alkoxyalkoxymethyl substituted delta-valerolactone.

4. A process as defined in claim 1 wherein the pressure varies from 500 p. s. i. to 5000 p. s. i.

5. A process as defined in claim 1 wherein the ether-alkyl substituted delta-valerolactone is a gamma-hydroxyalkoxymethyl substituted delta-valerolactone.

6. A process for preparing an ether-alkyl substituted 1,5-pentanediol which comprises treating a substituted delta-valerolactone of the formula

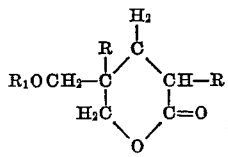

wherein R is a member of the group consisting of hydrogen and alkyl radicals containing from 1 to 8 carbon atoms and $R_1$ is a member of the group consisting of an alkyl, hydroxyalkyl and alkoxyalkyl radicals containing no more than 10 carbon atoms, with hydrogen at a superatmospheric pressure and a temperature between 130° C. and 275° C. in the presence of a catalyst of the group consisting of heavy metals of groups I, II and IV to VIII of the periodic table of elements, mixtures of these metals, their alloys and their sulfides, oxides and chromites, in an amount varying from 1% to 30% by weight of the lactone.

7. A process as in claim 6 wherein the lactone is alpha,gamma - dimethyl - gamma - (beta - hydroxyethoxymethyl)-delta-valerolactone.

8. A process as defined in claim 6 wherein the catalyst is copper chromite.

9. A process as defined in claim 6 wherein the catalyst is nickel.

10. A process for preparing a 2,4-dialkyl-2-alkoxymethyl-1,5 - pentanediol from alpha,gamma - dialkyl-gamma-alkoxymethyl-delta-valerolactone which comprises treating a solvent solution of the said lactone with hydrogen at a pressure of 250 to 5000 p. s. i. at a temperature between 175° C. and 275° C. in the presence of a catalyst of the group consisting of heavy metals of groups I, II and IV to VIII of the periodic table of elements, mixtures of these metals, their alloys and their sulfides, oxides and chromites, in an amount varying from 1% to 30% by weight of the lactone.

11. A process for preparing 2,4-dimethyl-2-methoxymethyl-1,5 - pentanediol from alpha,gamma - dialkyl-gamma-alkoxymethyl-delta-valerolactone which comprises treating a solvent solution of the said lactone with hydrogen at a pressure of 250 to 5000 p. s. i. at a temperature between 130° C. and 250° C. in the presence of a copper catalyst.

12. A process for preparing 2,4-dimethyl-2-ethoxyethoxymethyl - 1,5 - pentanediol from alpha,gamma-dimethyl - gamma - ethoxyethoxy - methyl - delta - valerolactone which comprises treating the said lactone with hydrogen at a pressure of 250 to 3000 p. s. i. at a temperature between 175° C. to 250° C. in the presence of a nickel catalyst.

13. A process for preparing 2,4-dimethyl-2-ethoxymethyl-1,5 - pentanediol from alpha-gamma - dimethyl-gamma - ethoxymethyl - delta - valerolactone which comprises treating the said lactone with hydrogen at a pressure of 200 p. s. i. to 3000 p. s. i. at a temperature between 130° C. and 275° C. in the presence of a nickel hydrogenation catalyst.

References Cited in the file of this patent

UNITED STATES PATENTS

| Number | Name | Date |
|---|---|---|
| 2,091,800 | Adkins et al. | Aug. 31, 1937 |
| 2,462,449 | Williams | Feb. 22, 1949 |

OTHER REFERENCES

Nystrom et al., J. Am. Chem. Soc. 70, page 3738 (1948).

Helberger et al., Ann. 561, page 215 (1949) C. A. 43, p. 4640 (h), (1949).

Wertheim, Textbook of Organic Chemistry, 2nd ed., The Blackiston Co., Philadelphia, Pa., page 356.